United States Patent
Lee et al.

(10) Patent No.: US 10,432,554 B2
(45) Date of Patent: Oct. 1, 2019

(54) BANDWIDTH PROVIDING METHOD BASED ON MULTI-FLOW GROUPING

(71) Applicant: KT Corporation, Seongnam-si, Gyeonggi-do (KR)

(72) Inventors: Se Hui Lee, Daejeon (KR); Tae Jin Ahn, Daejeon (KR); Kyung Ah Han, Daejeon (KR)

(73) Assignee: KT Corporation, Seongnam-si (KR)

( * ) Notice: Subject to any disclaimer, the term of this patent is extended or adjusted under 35 U.S.C. 154(b) by 616 days.

(21) Appl. No.: 14/914,685

(22) PCT Filed: Aug. 28, 2014

(86) PCT No.: PCT/KR2014/008002
§ 371 (c)(1),
(2) Date: Feb. 26, 2016

(87) PCT Pub. No.: WO2015/030491
PCT Pub. Date: Mar. 5, 2015

(65) Prior Publication Data
US 2016/0205041 A1    Jul. 14, 2016

(30) Foreign Application Priority Data

Aug. 28, 2013  (KR) .................. 10-2013-0102691

(51) Int. Cl.
*G06F 15/173* (2006.01)
*H04L 12/911* (2013.01)
(Continued)

(52) U.S. Cl.
CPC ........ *H04L 47/828* (2013.01); *H04L 41/0893* (2013.01); *H04L 41/0896* (2013.01);
(Continued)

(58) Field of Classification Search
CPC ............ H04L 47/828; H04L 41/0893; H04L 41/0896; H04L 47/2441; H04L 47/41;
(Continued)

(56) References Cited

U.S. PATENT DOCUMENTS 7,277,389 B2 * 10/2007 Bly ..................... H04L 47/10
370/230.1
8,675,488 B1 * 3/2014 Sidebottom ......... H04L 67/141
370/229

(Continued)

FOREIGN PATENT DOCUMENTS

| JP | 2003-163687 A | 6/2003 |
| KR | 10-2010-0132776 A | 12/2010 |
| KR | 10-2011-0037860 A | 4/2011 |

OTHER PUBLICATIONS

International Search Report of PCT/KR2014/008002 dated Nov. 25, 2014.

*Primary Examiner* — John B Walsh
(74) *Attorney, Agent, or Firm* — Sughrue Mion, PLLC

(57) ABSTRACT

Disclosed is a bandwidth providing method based on multi-flow grouping, which can control multi-terminal and multi-service for a user with a single bandwidth. The bandwidth providing method based on multi-flow grouping comprises a step of receiving a first packet flow and a second packet flow, a step of verifying a flow group comprising the first package flow and the second package flow using a flow group table, and a step of assigning a single bandwidth to the first packet flow and the second packet flow when the first packet flow and the second packet flow are verified as being comprised in the same group, thereby managing the bandwidth. Accordingly, the multi-terminal and multi-service of a user can be efficiently controlled with a single bandwidth.

13 Claims, 10 Drawing Sheets

(51) Int. Cl.
*H04L 12/24* (2006.01)
*H04L 12/851* (2013.01)
*H04L 12/721* (2013.01)
*H04L 12/751* (2013.01)
*H04L 12/709* (2013.01)
*H04L 12/891* (2013.01)
*H04L 12/26* (2006.01)
*H04L 12/46* (2006.01)

(52) U.S. Cl.
CPC ............ *H04L 45/02* (2013.01); *H04L 45/245* (2013.01); *H04L 45/38* (2013.01); *H04L 47/2441* (2013.01); *H04L 47/41* (2013.01); *H04L 12/4641* (2013.01); *H04L 43/026* (2013.01); *Y02D 50/30* (2018.01)

(58) Field of Classification Search
CPC ....... H04L 45/02; H04L 45/245; H04L 45/38; H04L 12/4641; H04L 43/026; Y02D 50/30
See application file for complete search history.

(56) References Cited

U.S. PATENT DOCUMENTS

| | | | |
|---|---|---|---|
| 2011/0231521 A1* | 9/2011 | Higgins | H04N 21/23406 709/219 |
| 2011/0317584 A1* | 12/2011 | Wu | H04L 12/2801 370/254 |
| 2013/0136064 A1* | 5/2013 | Jamadagni | H04L 69/26 370/328 |
| 2015/0009874 A1* | 1/2015 | Edara | H04W 52/0225 370/311 |

* cited by examiner

FIG. 3

| Flow ID | Type | Length | Value | Group ID |
|---|---|---|---|---|
| 00001 | MAC | 12 | aaaaaabbbbbb | 00001 |
| 00002 | IP | 15 | 192.168.100.100 | 00001 |
| 00003 | MAC | 12 | ccccccdddddd | 00002 |

FIG. 4

| Group ID | Queue ID | Flow Count | Type | Length | Value | Max Bandwidth | Min Bandwidth |
|---|---|---|---|---|---|---|---|
| 00001 | 0001 | 1 | MAC | 12 | aaaaaabbbbbb | 100Mbps | 10Mbps |
| 00002 | 0002 | 2 | IP | 15 | [1.1.1.1, 2.2.2.2] | 100Mbps | 10Mbps |
| 00003 | 0003 | 0 | N/A | N/A | N/A | 50Mbps | 5Mbps |

BANDWIDTH PROVIDING METHOD BASED ON MULTI-FLOW GROUPING

TECHNICAL FIELD

The present disclosure relates to a Software Defined Networking (SDN) technology, and more particularly to a method for providing a bandwidth based on multi-flow grouping, which can control multiple terminals and multiple services for a user to use a unified bandwidth.

BACKGROUND ART

Software-defined networking (SDN) means a user-oriented network in which a user has control authority regardless of a basic network device such as a router or a switch, etc. and a separate software controller controls a flow of traffic.

In the SDN environment, a flow table including identification information of traffic flows and information for processing flows is managed. When actual user traffic is generated, a flow entry corresponding to the generated traffic is identified using the flow table, and a packet processing manner for the generated traffic is determined according to the identified flow entry.

The packet processing manners in the SDN environment may include traffic forwarding, traffic dropping, traffic modification, traffic queuing, etc.

The traffic forwarding is a function of outputting traffics through a specific output port, and the traffic dropping is a function of discarding traffics without outputting them through a specific output port. Also, the traffic modification is a function of modifying information of traffic headers such as virtual local area network (VLAN) tags, and the traffic queuing is a function of providing a Quality of Service (QoS) by scheduling traffics by using a queue in the traffic forwarding.

For QoS provisioning in a network apparatus such as a switch or router, there are basic QoS functions such as rate-limiting based on per-flow metering and enhanced QoS functions such as DiffServ utilizing queues for respective ports.

The network apparatus has a metering management table, manages the amount of packets for respective flows of the flow table by using the metering management table, and controls bandwidths for respective flows.

Also, the network apparatus can determine a manner of controlling a flow bandwidth such as rate-limiting, shaping, policing, etc., and restrict a bandwidth precisely by using minimum bandwidth information, maximum bandwidth information, etc.

In other words, QoS is provided through per-flow metering or per-port queues in the SDN environment, and traffic forwarding is processed according to a QoS policy configured for each flow or port.

However, since a method for managing multiple flows by using a single QoS policy is not available, there is a limitation that a unified bandwidth cannot be provided to multiple terminals and multiple services belonging to the same user.

DISCLOSURE

Technical Problem

The purpose of the present invention for resolving the above-described problem is to provide a method for grouping multiple flows (multi-flow grouping).

Also, another purpose of the present invention for resolving the above-described problem is to provide a method of providing a unified bandwidth based on multi-flow grouping.

Technical Solution

In some example embodiments of the present invention, a method of managing a bandwidth, performed by a network apparatus under control of a network control apparatus in a software defined networking (SDN) environment, may comprise receiving a first packet flow and a second packet flow; identifying a flow group to which the first package flow and the second package flow belong by using a flow group table; and assigning a unified bandwidth to the first packet flow and the second packet flow when the first packet flow and the second packet flow are identified as belonging to a same flow group, thereby managing the unified bandwidth.

Here, the first packet flow and the second packet flow may be transmitted by different terminals of a same user.

Here, the first packet flow and the second packet flow may be transmitted by different services of a same terminal.

Here, the flow group table may comprise at least one of a terminal Medium Access Control (MAC) address, a Virtual Local Area Network (VLAN) identifier (ID), a terminal internet protocol (IP) address, queue identification information, minimum bandwidth information, and maximum bandwidth information.

Here, the flow group table may be updated according to a flow group table modification request from the network control apparatus.

Here, the flow group table modification request may be performed based on a user table managed and obtained from a user management system.

In other example embodiments of the present invention, a method of managing a bandwidth, performed in a network control apparatus by controlling at least one network apparatus in a software defined network (SDN) environment, may comprise receiving a first packet flow and a second packet flow through the at least one network apparatus; identifying a flow group to which the first package flow and the second package flow belong based on a user table; and requesting the network apparatus to modify a flow group table based on information on the identified flow group.

In other example embodiments of the present invention, a method of managing a bandwidth, performed by a network control apparatus and a network apparatus in a software defined network (SDN) environment, may comprise receiving, at the network apparatus, at least one packet flow; identifying, at the network apparatus, respective flow groups for respective packet flows included in the at least one packet flow by using a flow group table; and assigning, at the network control apparatus, a unified bandwidth to packet flows identified as belonging to a same flow group among the at least one packet flow, and managing the unified bandwidth.

Also, the method may further comprise receiving, at the network control apparatus, a packet flow whose flow group is not identified by the network apparatus from the network apparatus; and identifying, at the network control apparatus, a flow group to which the packet flow whose flow group is not identified by the network apparatus based on a user table.

Also, the method may further comprise requesting, by the network control apparatus, the network apparatus to modify the flow group table based on information on the identified flow group for the packet flow whose flow group is not identified by the network apparatus.

Also, the method may further comprise updating, by the network apparatus, the flow group table according to the request to modify the flow group table which is received from the network control apparatus.

Advantageous Effects

The above-described method for providing a bandwidth based on multi-flow grouping according to the present disclosure may efficiently control a plurality of terminals or a plurality of services of a user by using a unified bandwidth.

Also, the above-described method can be efficiently applied to usage-based services of telecommunication operators.

DESCRIPTION OF DRAWINGS

FIG. 3 is an exemplary view to explain a data structure of a flow table according to an exemplary embodiment of the present disclosure.

FIG. 4 is an exemplary view to explain a data structure of a flow group table according to an exemplary embodiment of the present disclosure.

BEST MODE

Figure 1:
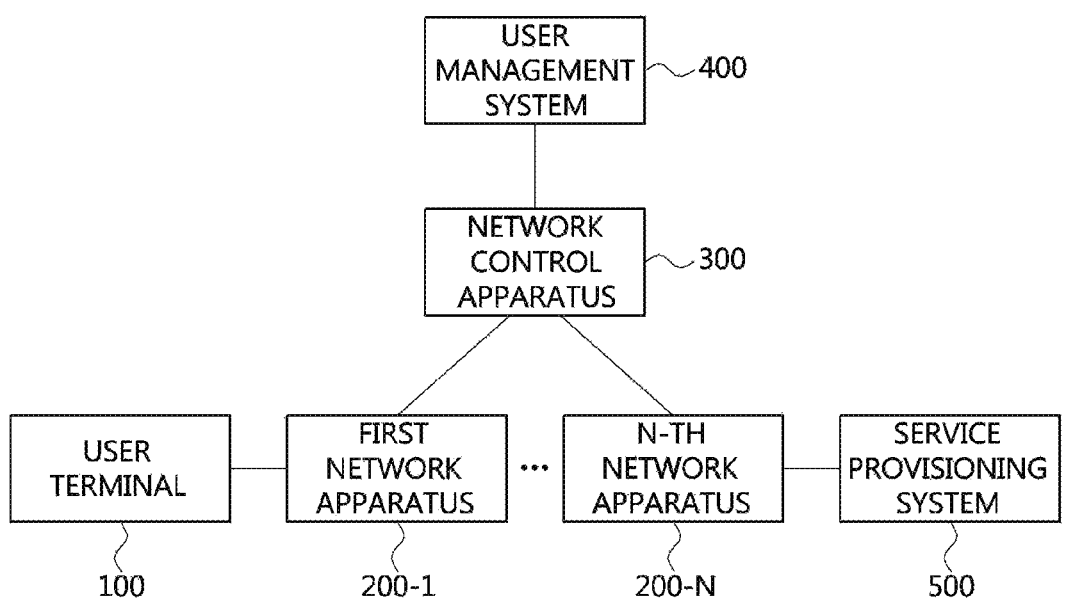
FIG. 1 is a block diagram to explain an environment to which a bandwidth providing method based on multi-flow grouping according to an exemplary embodiment of the present disclosure is provided.

While the invention is susceptible to various modifications and alternative forms, specific embodiments thereof are shown by way of examples in the drawings and will herein be described in detail. It should be understood, however, that there is no intent to limit the invention to the particular forms disclosed, but on the contrary, the invention is meant to cover all modifications, equivalents, and alternatives falling within the spirit and scope of the invention. Like numbers refer to like elements in the accompanying drawings.

It will be understood that, although the terms first, second, A, B, etc. may be used herein to describe various elements, these elements should not be limited by these terms. These terms are only used to distinguish one element from another. For example, a first element could be termed a second element, and, similarly, a second element could be termed a first element, without departing from the scope of the inventive concept. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, it will be understood that when an element is referred to as being "directly connected" or "directly coupled" to another element, there are no intervening elements present.

The terminology used herein is for the purpose of describing particular embodiments only and is not intended to be limiting of the invention. As used herein, the singular forms "a", "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, embodiments of the present invention will be described in detail with reference to the appended drawings. In the following description, for easy understanding, like numbers refer to like elements throughout the description of the figures, and the same elements will not be described further.

FIG. 1 is a block diagram to explain an environment to which a bandwidth providing method based on multi-flow grouping according to an exemplary embodiment of the present disclosure is provided.

Referring to FIG. 1, a method for providing a bandwidth based on multi-flow grouping according to an exemplary embodiment of the present disclosure may be performed through interactions among a user terminal 100, a plurality of network apparatuses 200-1 to 200-n, a network control apparatus 300, a user management system 400, and a service provisioning system 500.

A user may use a plurality of user terminals 100 or use a plurality of services in a single user terminal. The user terminal 100 may be connected to the service provisioning system 500 through the plurality of network apparatuses 200-1 and 200-n.

The plurality of network apparatuses 200-1 to 200-*n* may constitute a network, and the network control apparatus 300 may control and manage the plurality of network apparatuses 200-1 to 200-*n*.

Each of the network apparatuses 200-1 to 200-*n* may be a switch or a router corresponding to a data plane of a software defined network (SDN), or may be a policy-based router corresponding to a policy enforcement point (PEP) of a policy based network. For example, each of the network apparatuses 200-1 to 200-*n* may be an OpenFlow switch of an Open Networking Foundation (ONF), or may be an I2RS agent or a network element using an interface to the routing system (I2RS) protocol defined in an internet engineering task force (IETF).

The network control apparatus 300 may be a controller corresponding to a control plane of SDN, or a policy control system corresponding to a policy decision point (PDP) of the policy based network. For example, the network control apparatus 300 may be an OpenFlow controller of the ONF, or may be a topology manager or an I2RS client according to the I2RS protocol of the IETF.

Also, the network control apparatus 300 may include a plurality of apparatuses or systems having relations such as master-master, master-slave, etc., and a single network apparatus may be controlled by a plurality of network control apparatuses.

The user management system 400 may provide mapping information among users and terminals to the network control apparatus 300. Here, the mapping information may be pre-constructed through a subscription procedure before the user terminal 100 accesses the network, or generated through an authentication procedure for the user terminal 100. For example, the user management system 400 may be a user management server administrated by a telecommunication operator for managing the user terminal 100.

The service provisioning system 500 may be a system which actually provides at least one service to the user terminal through the network apparatuses 200-1 to 200-*n*. For example, the service provisioning system 500 may be administrated by an online service provider.

Hereinafter, in the following descriptions for exemplary embodiments of the present disclosure, a 'packet flow' may mean an actual traffic constituted by packets exchanged over a network. Also, a flow may be identified by a network apparatus based on information included in packets constituting the flow, such as a MAC address of a terminal, a Virtual Local Area Network (VLAN) identifier (ID), and an internet protocol (IP) address assigned to a terminal, etc. Accordingly, a 'multi-flow grouping' may mean grouping a plurality of packet flows which can be discriminated and identified by a network apparatus into respective flows.

Figure 2:
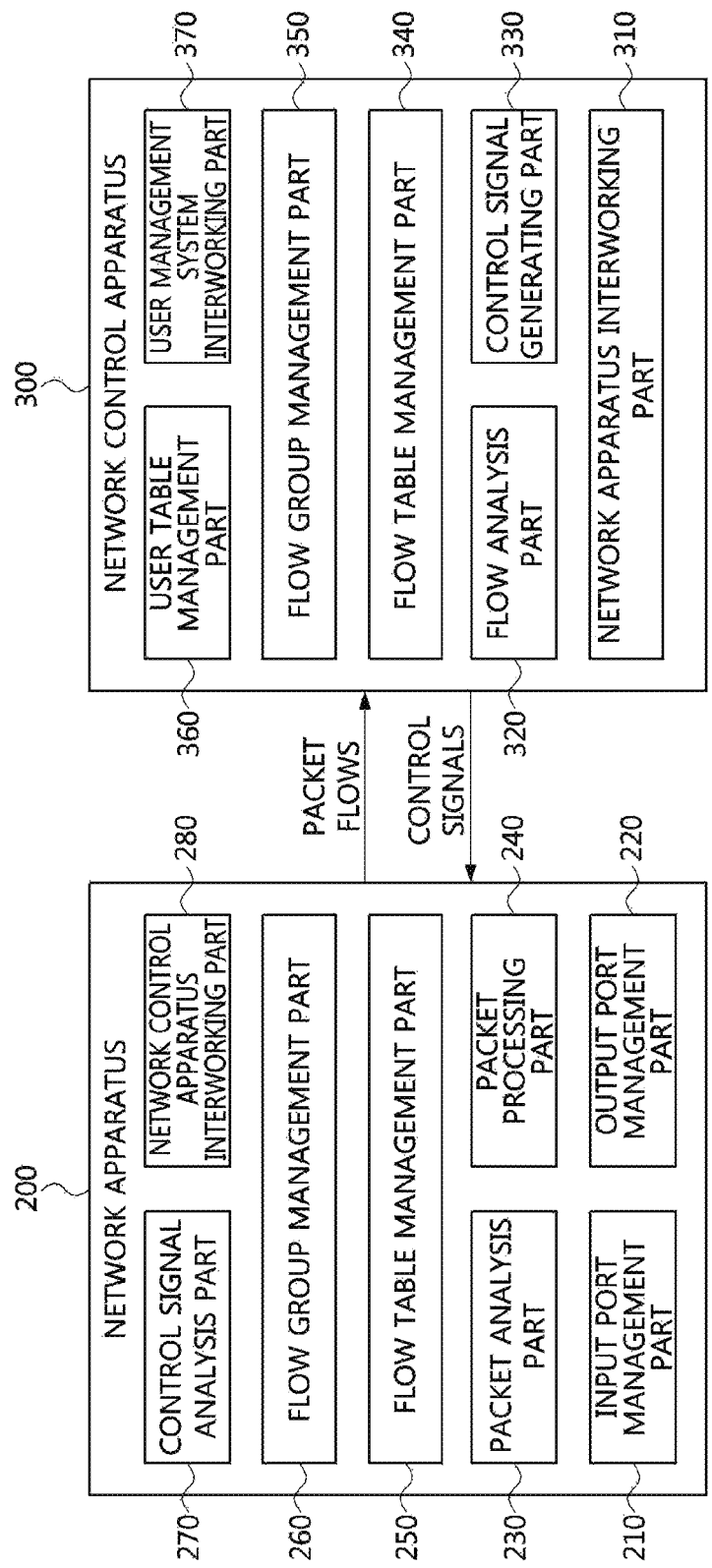
FIG. 2 is a block diagram illustrating exemplary compositions of a network apparatus and a network control apparatus for multi-flow grouping according to an exemplary embodiment of the present disclosure.

FIG. 2 is a block diagram illustrating exemplary compositions of a network apparatus and a network control apparatus for multi-flow grouping according to an exemplary embodiment of the present disclosure.

Referring to FIG. 2, compositions of a network apparatus and a network control apparatus performing a bandwidth providing method based on multi-flow grouping according to an exemplary embodiment of the present disclosure will be explained.

First, a network apparatus 200 may comprise an input port management part 210, an output port management part 220, a packet analysis part 230, a packet processing part 240, a flow table management part 250, a flow group management part 260, a control signal analysis part 270, and a network control apparatus interworking part 280.

The input port management part 210 may manage packet flows received from the user terminal, and the output port management part 220 may manage packet flows to be transmitted to the network control apparatus 300 or the service provisioning system 500.

The packet analysis part 230 may analyze packet flows received through the input port management part 210. For example, the packet analysis part 230 may analyze types, properties, etc. of the received packet flows, and provide the analysis result to the packet processing part 240.

The packet processing part 240 may process the packet flows received through the input port management part 210. For example, the packet processing part 240 may transfer the processed packet flows to the network control apparatus 300 or the service provisioning system 500. Also, the packet processing part 240 may process the received packet flows by using the analysis result from the packet analysis part 230, flow tables stored in the flow table management part 250, and a flow group table stored in the flow group management part 260.

The flow table management part 250 may store and manage flow tables each of which is a set of flow entries.

The flow group management part 260 may store and manage the flow group table needed for grouping a plurality of terminals or a plurality of services for a single terminal.

The control signal analysis part 270 may analyze and process control signals or control messages received from the network control apparatus 300.

The network control apparatus interworking part 280 may process a protocol for communicating with the network control apparatus 300.

Second, the network control apparatus 300 may comprise a network apparatus interworking part 310, a flow analysis part 320, a control signal generating part 330, a flow table management part 340, a flow group management part 350, a user table management part 360, and a user management system interworking part 370.

The network apparatus interworking part 310 may process a protocol for communicating with the network apparatus 200.

The flow analysis part 320 may analyze packet flows received from the network apparatus 200. For example, the flow analysis part 320 may analyze types, properties, etc. of the packet flows, and provide the analysis result to the control signal generating part 330.

The control signal generating part 330 may generate control signals or control messages for controlling the network apparatus 200. For example, the control signal generating part 330 may generate control signals or control messages by using the analysis result from the flow analysis part 320, the flow table stored in the flow table management part 340, and a flow group table stored in the flow group management part 350.

The flow table management part 340 may store and manage the flow table for the plurality of network apparatuses 200-1 to 200-*n* under control of the network control apparatus 300.

The flow group management part 350 may store and manage the flow group table needed for grouping a plurality of terminals or a plurality of services for a single terminal.

The user table management part 360 may receive information on terminals from the user management system 400, and generate and manage a user table by using the mapping information defining relations among users and terminals. For example, as described above, the mapping information may be generated by the user management system 400 through the subscription procedure or the authentication procedure.

The user management system interworking part 370 may process a protocol for communicating with the user management system 400.

FIG. 3 is an exemplary view to explain a data structure of a flow table according to an exemplary embodiment of the present disclosure, and FIG. 4 is an exemplary view to explain a data structure of a flow group table according to an exemplary embodiment of the present disclosure.

Referring to FIG. 3, the flow table may have a data structure comprising fields such as 'Flow ID', 'Type', 'Length', 'Value', 'Group ID', etc.

The 'Flow ID' field may represent an identifier for discriminating a specific flow among a plurality of flows in the flow table, the 'Type' field may represent the type of information used for discriminating flows such as 'MAC' or 'IP', and the 'Value' field may represent flow identification information (i.e., MAC address or IP address) corresponding to the type indicated by the 'Type' field. Also, the 'Length' field may represent the length of a corresponding flow entry, and the 'Group ID' field may represent an identifier of a flow group to which a packet flow belongs.

Referring to FIG. 4, the flow group table may have a data structure comprising fields such as 'Group ID', 'Queue ID', 'Flow Count', 'Type', 'Length', 'Value', 'Max Bandwidth', 'Min Bandwidth', etc.

The 'Group ID' field may represent an identifier for discriminating a specific flow group among a plurality of flow groups in the flow group table, and the 'Queue ID' field may represent an identifier of an output queue for a corresponding flow group. The 'Flow Count' field may represent the number of flows which the corresponding flow group has, and the 'Max Bandwidth' field and 'Min Bandwidth' field may respectively represent maximum/minimum bandwidth setting values for the corresponding flow group. Also, each of the 'Type', 'Length', and 'Value' may have the same meaning as that of the flow table data structure.

Figure 5:
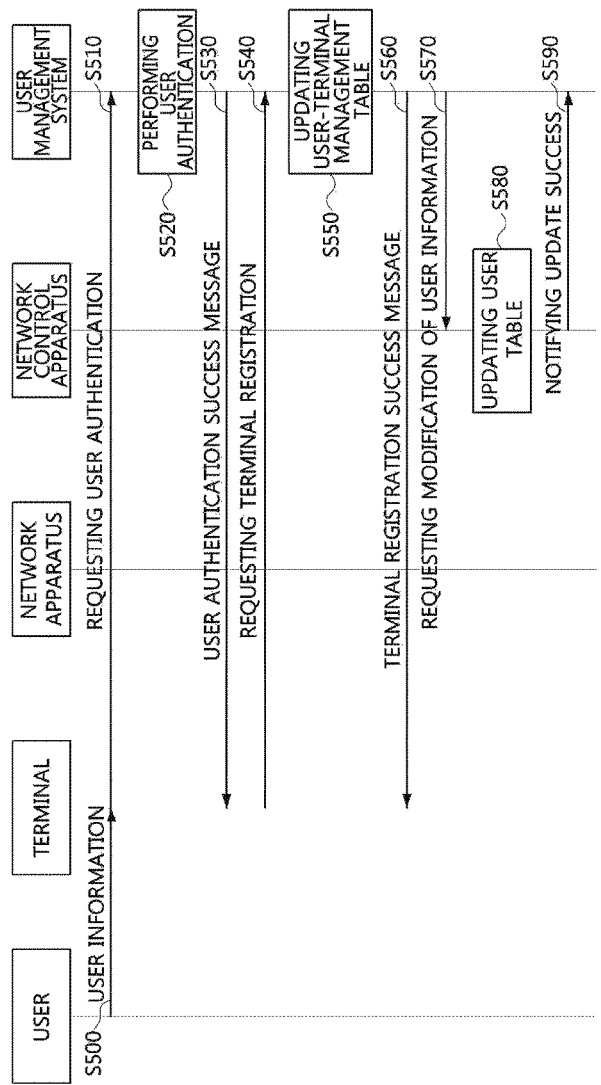
FIG. 5 is a sequence chart to explain a procedure of modifying a user table performed by a network control apparatus based on a user authentication procedure according to an exemplary embodiment of the present disclosure.

FIG. 5 is a sequence chart to explain a procedure of modifying a user table performed by a network control apparatus based on a user authentication procedure according to an exemplary embodiment of the present disclosure.

Referring to FIG. 5, the user table, which the network control apparatus according to an exemplary embodiment of the present disclosure has, may be modified through information exchange among the terminal, the network apparatus, the network control apparatus, and the user management system.

A user may input user information to the terminal using a user interface (UI) (S500). Here, the user information may mean information for identifying the user such as a user identifier, a password, etc.

The terminal may transfer the inputted user information to the user management system and request authentication of the user (S510).

The user management system may perform an authentication procedure for identifying and verifying the user identifier, the password, etc. (S520), and transmit a user authentication success message to the terminal when the user authentication succeeds (S530).

When the terminal receives the user authentication success message, the terminal may transfer terminal information to the user management system and request a terminal registration (S540). Here, the terminal information may mean information for identifying the terminal such as a MAC address of the terminal or an IP address assigned to the terminal.

The user management system may perform mapping between the user information and the terminal information, update a user-terminal management table (S550), and transmit a terminal registration success message to the terminal (S560). Here, the user-terminal management table is a table which the user management system generates and manages to manage the terminal, and may comprise the user information and the terminal information.

The user management system may request modification of user information to the network control apparatus by providing the user information and the terminal information (S570).

The network control apparatus may update the user table by using the user information and the terminal information received from the user management system (S580), and notify to the user management system that the user table has been successfully updated (S590).

Accordingly, the network control apparatus may update and manage the user table by interworking with the user management system.

Figure 6:
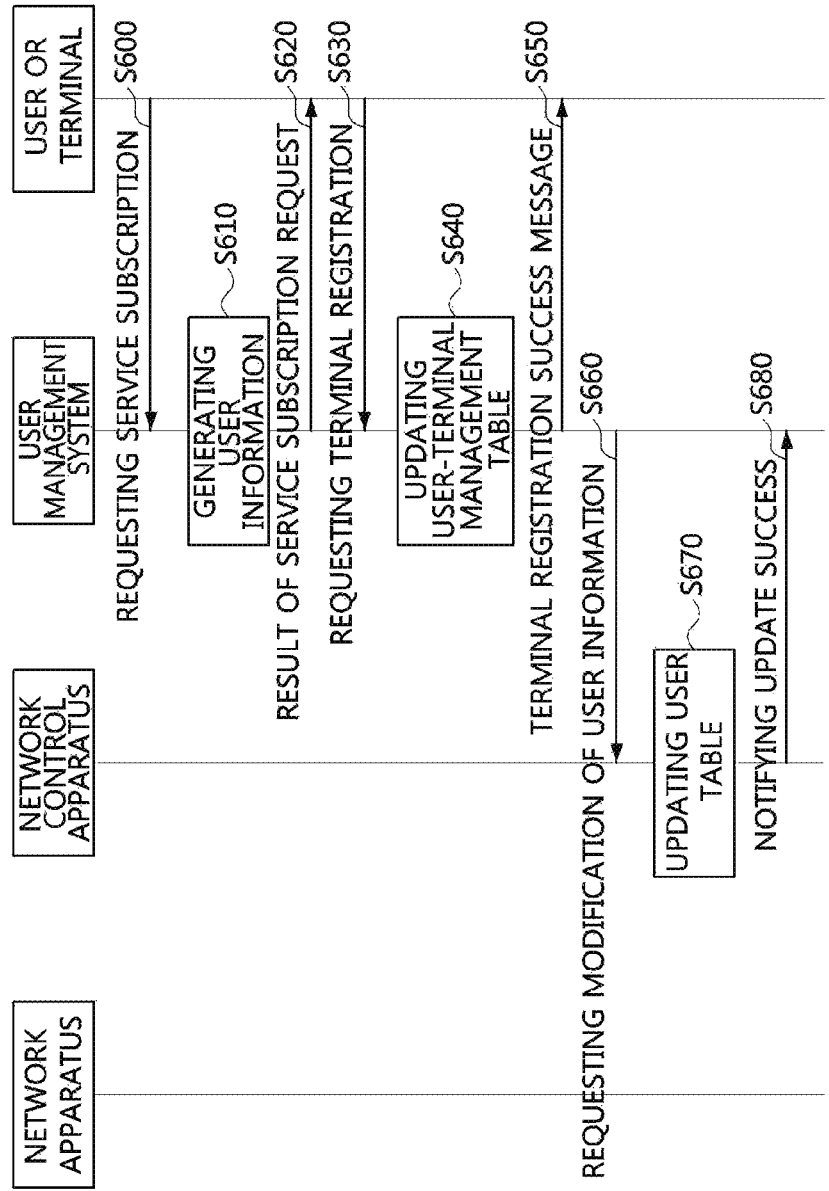
FIG. 6 is a sequence chart to explain a procedure of modifying a user table of a network control apparatus through a user subscription procedure according to an exemplary embodiment of the present disclosure.

FIG. 6 is a sequence chart to explain a procedure of modifying a user table of a network control apparatus through a user subscription procedure according to an exemplary embodiment of the present disclosure.

Referring to FIG. 6, a procedure of modifying a user table based on a user subscription procedure for a new user will be explained.

A user may request a new subscription of a network access service to the user management system (S600).

The user management system may newly generate user information for the new user (S610), and transfer a result of the service subscription request to the user (S620). In this instance, network service information may be generated together with the user information, and the network service information may include the maximum number of terminals accessing the service, service maximum bandwidth information, service minimum bandwidth information, etc.

The terminal may transfer the terminal information to the user management system and request a terminal registration (S630).

The user management system may update the user-terminal management table by performing mapping between the user information and the terminal information (S640), and transmit a terminal registration success message to the terminal (S650).

The user management system may transfer the user information and the terminal information to the network control apparatus, and request modification of user information (S660).

The network control apparatus may update the user table by using the user information and the terminal information received from the user management system (S670), and notify to the user management system that the user table has been updated successfully (S680).

Accordingly, the network control apparatus may update and manage the user table for the new user by interworking with the user management system.

Figure 7:
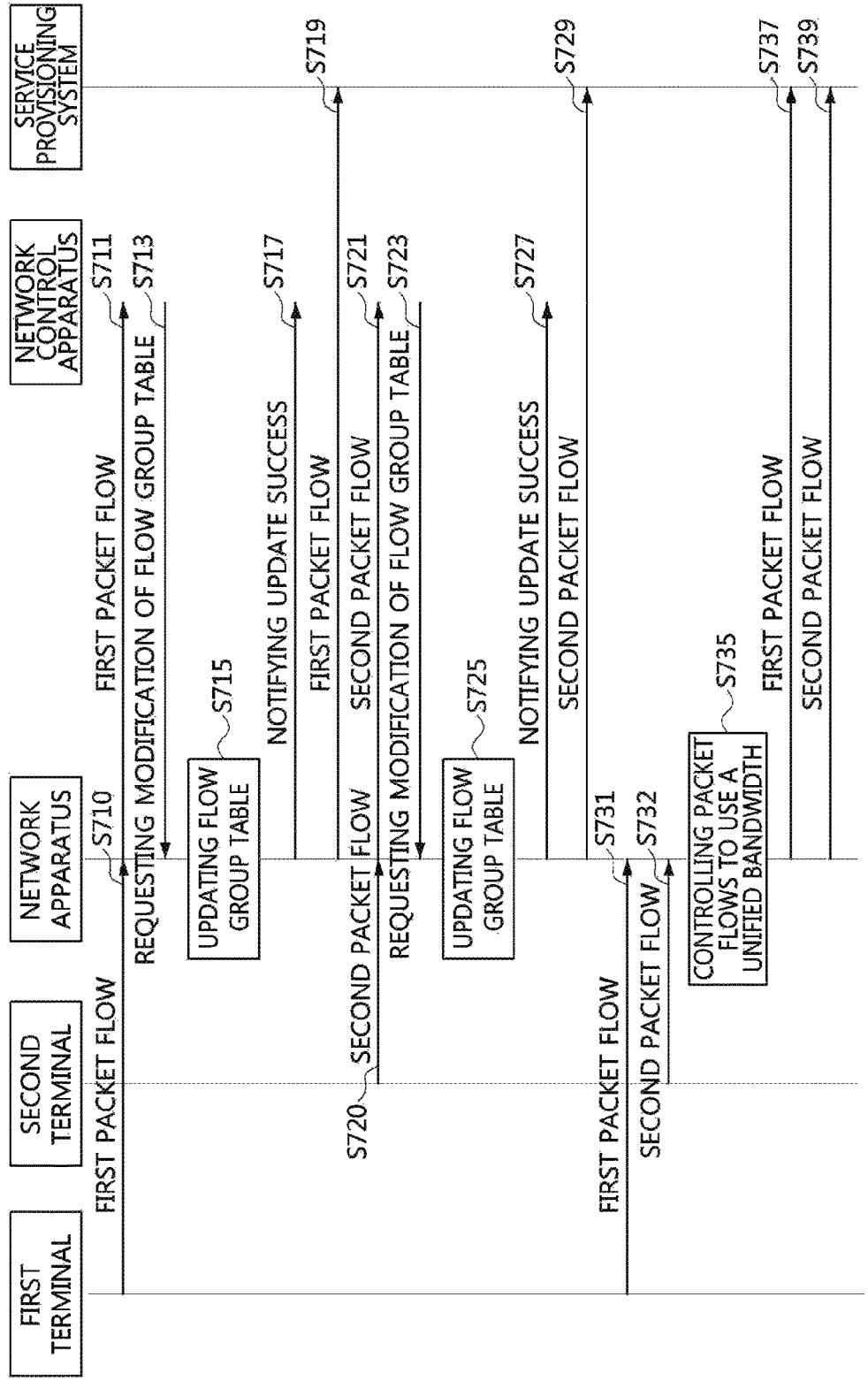
FIG. 7 is a sequence chart to explain a procedure of providing a unified bandwidth to a plurality of terminals according to an exemplary embodiment of the present disclosure.

FIG. 7 is a sequence chart to explain a procedure of providing a unified bandwidth to a plurality of terminals according to an exemplary embodiment of the present disclosure.

In FIG. 7, a first terminal and a second terminal may be operated by a same user. Also, it may be assumed that a first packet flow from the first terminal and a second packet flow from the second terminal belong to a same flow group. That is, the first packet flow and the second packet flow may be grouped into a same flow group. For example, a flow group ID for the first packet flow and the second packet flow may be a flow group A.

Also, it may be assumed that a maximum bandwidth 100 Mbps is assigned to the flow group A.

The first packet flow of the first terminal may be transferred to the network apparatus (S710).

When the network apparatus cannot identify information on a flow group to which the first packet flow belongs even by referring to the flow group table, the network apparatus may transfer the first packet flow to the network control apparatus (S711).

The network control apparatus may search a flow group onto which the first packet flow is mapped by referring to the user table, and request the network apparatus to modify the flow group table (S713). Also, the network control apparatus may transfer a flow group ID, maximum bandwidth information, minimum bandwidth information of the flow group for the first packet flow to the network apparatus for modification of the flow group table.

According to the request of the network control apparatus, the network apparatus may update the flow group table (S715). For example, the network apparatus may update the flow group table such that the first packet flow belongs to the flow group A.

Also, the network apparatus may notify success of the update on the flow group table to the network control apparatus (S717).

In this case, referring to the flow group table, it can be known that only the first packet flow belonging to the flow group A is being transferred to the network apparatus.

Therefore, in a case that the maximum bandwidth 100 Mbps is assigned to the flow group A, the first packet flow may solely use the maximum bandwidth 100 Mbps, and packets of the first packet flow may be forwarded to the service provisioning system (S719).

The second packet flow of the second terminal may be transferred to the network apparatus (S720).

When the network apparatus cannot identify information on a flow group to which the second packet flow belongs even by referring to the flow group table, the network apparatus may transfer the second packet flow to the network control apparatus (S721).

The network control apparatus may search a flow group onto which the second packet flow is mapped by referring to the user table, and request the network apparatus to modify the flow group table (S723).

According to the request of the network control apparatus, the network apparatus may update the flow group table (S725). For example, the network apparatus may update the flow group table such that the second packet flow is added to the flow group A.

Also, the network apparatus may transmit a result indicating success of the update on the flow group table to the network control apparatus (S727).

In this case, referring to the flow group table, it can be known that both of the first packet flow and the second packet flow belong to the flow group A.

Therefore, in the case that the maximum bandwidth 100 Mbps is assigned to the flow group A, the first packet flow and the second packet flow may use the maximum bandwidth 100 Mbps together. That is, a sum of a bandwidth for the first packet flow and a bandwidth of the second packet flow may be controlled to be equal to or less than 100 Mbps.

The second packet flow may use its bandwidth such that the sum of the first packet flow bandwidth and the second packet flow bandwidth does not exceed 100 Mbps, and packets of the second packet flow may be forwarded to the service provisioning system (S729). For example, the network apparatus may equally assign 50 Mbps to each of the first packet flow and the second packet flow.

After the flow group table is updated such that the first packet flow and the second packet flow belong to the flow group A, the first packet flow and the second packet flow may be transferred to the network apparatus (S731, S732). In this case, referring to the flow group table, the network apparatus may control the first packet flow and the second packet flow to use a unified bandwidth (S735).

Therefore, in the case that the maximum bandwidth 100 Mbps is given to the flow group A, the first packet flow and the second packet flow may use the maximum bandwidth 100 Mbps together (S737, S739).

Figure 8:
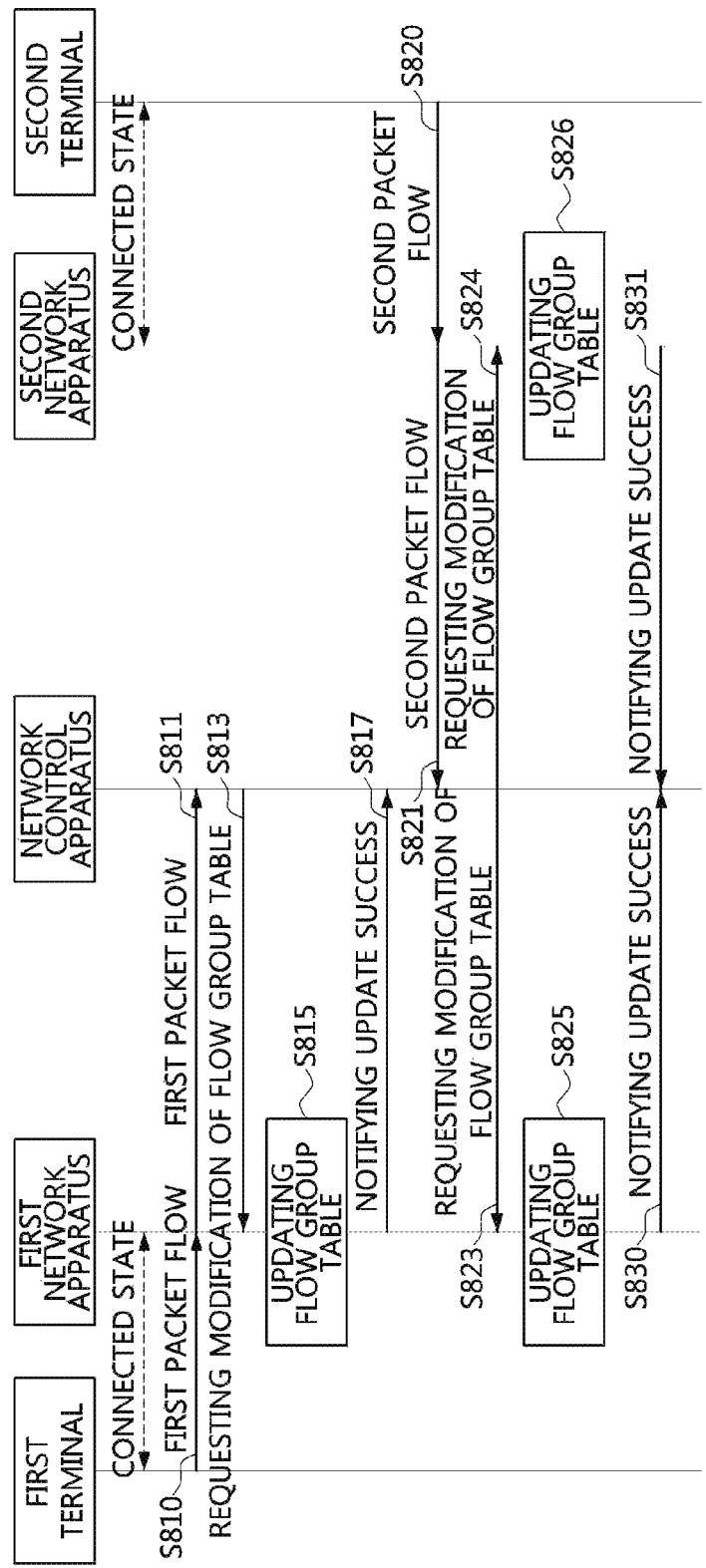
FIG. 8 is a sequence chart to explain a procedure of providing a unified bandwidth to a plurality of terminals connected to different network apparatuses according to an exemplary embodiment of the present disclosure.

FIG. 8 is a sequence chart to explain a procedure of providing a unified bandwidth to a plurality of terminals connected to different network apparatuses according to an exemplary embodiment of the present disclosure.

Referring to FIG. 8, a procedure for providing a unified bandwidth to a plurality of terminals connected to different network apparatuses will be explained.

In FIG. 8, a first terminal and a second terminal may be operated by a same user. Also, it may be assumed that a first packet flow from the first terminal and a second packet flow from the second terminal belong to a same flow group. That is, the first packet flow and the second packet flow may be grouped into a same flow group. For example, a flow group ID for the first packet flow and the second packet flow may be a flow group A.

Also, the first terminal is connected to a first network apparatus, the second terminal is connected to a second network apparatus, and it may be assumed that a maximum bandwidth 100 Mbps is assigned to the flow group A.

The first packet flow of the first terminal may be transferred to the first network apparatus (S810).

The first network apparatus may identify a flow group for the first packet flow by referring to the flow group table, and transfer the first packet flow to the network control apparatus (S811).

The network control apparatus may search a flow group onto which the first packet flow is mapped by referring to the user table, and request the first network apparatus to modify the flow group table (S813). Also, the network control apparatus may transfer a flow group ID, maximum bandwidth information, minimum bandwidth information of the flow group for the first packet flow to the first network apparatus for modification of the flow group table.

The first network apparatus may update the flow group table according to the request of the network control apparatus (S815). For example, the first network apparatus may update the flow group table such that the first packet flow belongs to the flow group A.

Also, the first network apparatus may transmit a result indicating success of the update on the flow group table to the network control apparatus (S817).

In this instance, referring to the flow group table which the first network apparatus has, it can be known that only the first packet flow belonging to the flow group A is being transferred to the first network apparatus.

Therefore, in the case that the maximum bandwidth 100 Mbps is given to the flow group A, similarly to the above-described case of the step S719, the first packet flow may solely use the maximum bandwidth 100 Mbps, and packets of the first packet flow may be forwarded to the service provisioning system.

However, if it is not necessary to modify the flow group table which the first network apparatus has (i.e., when the first network apparatus already knows the flow group of the first packet flow), the steps S813, S815, and S817 for updating the flow group table may be omitted.

While the first packet flow is being forwarded to the service provision system, the second packet flow of the second terminal may be transferred to the second network apparatus (S820).

The second network apparatus may identify a flow group for the second packet flow by referring to the flow group table, and transfer the second packet flow to the network control apparatus (S821).

The network control apparatus may search a flow group onto which the second packet flow is mapped by referring to the user table, and request the first packet flow and the second network apparatus to modify respective flow group tables (S823 and S824).

For example, the network control apparatus may request the first network apparatus and the second network apparatus to modify respective flow group tables such that a maximum 50 Mbps bandwidth is assigned to each of packet flows belonging to the flow group A.

The first network apparatus and the second network apparatus may update respective flow group tables according to the request of the network control apparatus (S825 and S826).

Also, the first network apparatus and the second network apparatus may respectively transfer results indicating success of the updates on the respective flow group fables to the network control apparatus (S830 and S831).

Therefore, when a plurality of terminals are connected to different network apparatuses, a unified bandwidth can be provided to a plurality of packet flows from the plurality of terminals.

For example, even when the first packet flow and the second packet flow are transferred to the network control apparatus through different network apparatuses, the first packet flow and the second packet flow may use the maximum, bandwidth 100 Mbs together. That is, each bandwidth of the first packet flow and the second packet flow may be controlled such that the sum of bandwidths of two packet flows does not exceed 100 Mbps.

In the flowing descriptions, a bandwidth providing method based on multi-flow grouping according to an exemplary embodiment of the present disclosure will be explained in detail.

Referring to FIG. 7 and FIG. 8, a user may use two or more terminals, and the network apparatus may manage packet flows of the multiple terminals by grouping the packet flows based on the flow group table such that the plurality of terminals can be controlled to use a unified bandwidth.

Furthermore, although an exemplary embodiment in which the first packet flow and the second packet flow are transmitted by different terminals is explained by referring to FIG. 7 and FIG. 8, the first packet flow and the second packet flow may also be transmitted by different services in the same terminal.

The flow group table may be transferred from the network control apparatus to the network apparatus, and be managed by the network apparatus. The flow group table may comprise information such as a MAC address of a terminal, a VLAN ID, an IP address assigned to a terminal, etc.

Also, the flow group table may comprise information such as queue ID information, minimum bandwidth information, maximum bandwidth information, etc. in order to manage the plurality of packet flows to use a unified bandwidth. In other words, when actual packet flows are inputted from the terminal to the network apparatus, the network apparatus may control bandwidths of them by referring to the flow group table.

The network apparatus may have the flow table in addition to the flow group table. The flow table may manage flow identification information such as terminal MAC addresses, VLAN ID, terminal IP address, etc. and a flow group ID indicating a flow group entry in the flow group table to which should be referred for controlling the plurality of packet flows to use the unified bandwidth. In this case, the flow group table may have queue ID information, minimum bandwidth information, maximum bandwidth information, etc.

Through the user table update procedure explained referring to FIG. 5 and FIG. 6, the network control apparatus may store and manage the user table including identifiers for grouping multiple flows.

Also, the network control apparatus may modify the flow group table of the network apparatus by using information of the user table.

An aspect of the network apparatus and an aspect of the network control apparatus for the bandwidth providing method based on multi-flow grouping according to an exemplary embodiment of the present disclosure can be explained as follows.

First, the bandwidth providing method based on multi-flow grouping will be explained from an aspect of the network apparatus.

The network apparatus may receive a first packet flow and a second packet flow, and identify a flow group to which the first packet flow and the second packet flow belong by using the flow group table.

Also, when the first packet flow and the second packet flow are identified as belonging to a same flow group, the network apparatus may assign a unified bandwidth to the first packet flow and the second packet flow.

Second, the bandwidth providing method based on multi-flow grouping will be explained from an aspect of the network control apparatus.

The network control apparatus may receive a first packet flow and a second packet flow through a same network apparatus or different network apparatuses, and identify flow group information for the first packet flow and the second packet flow by using the user table.

Also, the network control apparatus may request the network apparatus to modify the flow group table based on the flow group information.

Here, the first packet flow and the second packet flow may be transmitted respectively by a plurality of terminals owned by a same user, or transmitted respectively by a plurality of services in a same terminal.

Figure 9:
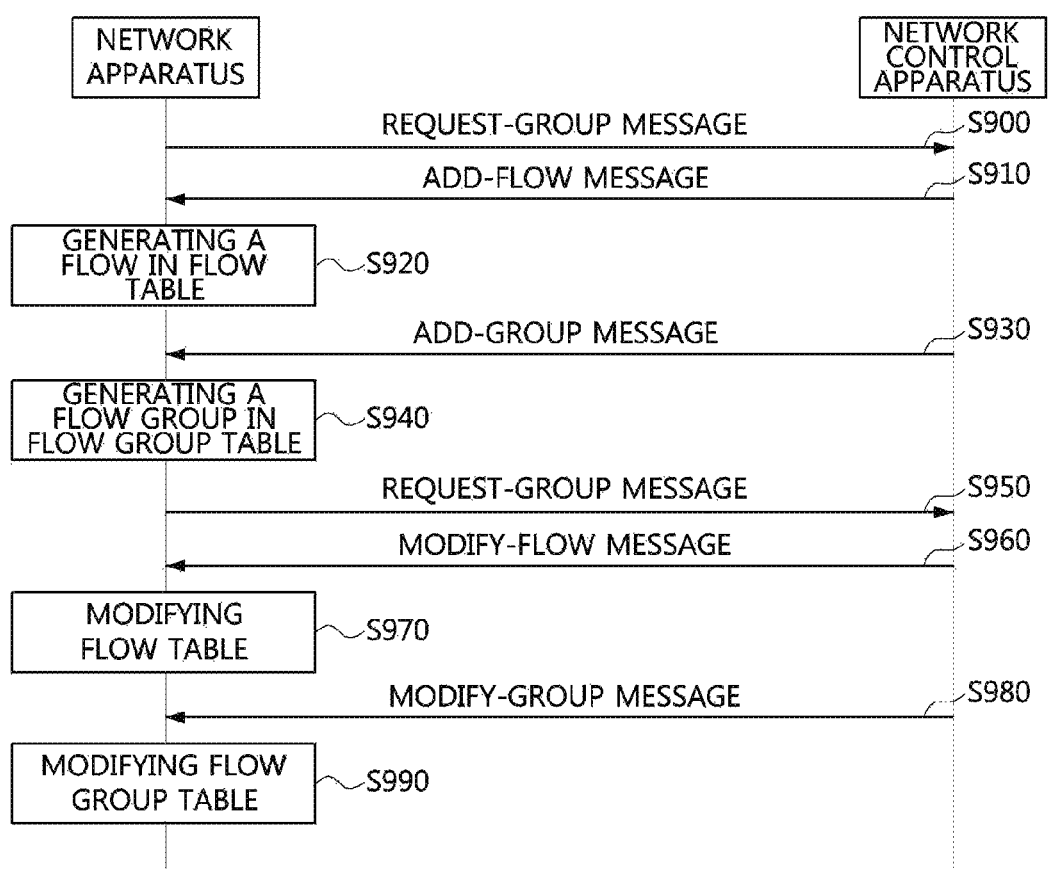
FIG. 9 is a sequence chart to explain a procedure, in which a network apparatus and a network control apparatus manage a flow table and a flow group table, according to an exemplary embodiment of the present disclosure.

FIG. 9 is a sequence chart to explain a procedure, in which a network apparatus and a network control apparatus manage a flow table and a flow group table, according to an exemplary embodiment of the present disclosure.

First, messages utilized for the network control apparatus to manage flow tables and a flow group table of the network apparatus may be defined as follows.

Request-Group Message

The 'Request-Group' message is a message used for the network apparatus to request flow group information to the network control apparatus.

Add-Flow Message

The 'Add-Flow' message is a message used for the network control apparatus to add a new flow to the flow table of the network apparatus.

Add-Group Message

The 'Add-Group' message is a message used for the network control apparatus to add a new flow group to the flow group table of the network apparatus.

Modify-Flow Message

The 'Modify-Flow' message is a message used for the network control apparatus to modify the flow table of the network apparatus.

Modify-Group Message

The 'Modify-Group' message is a message used for the network control apparatus to modify the flow group table of the network apparatus.

Delete-Group Message

The 'Delete-Group' message is a message used for the network control apparatus to delete a flow group from the flow group table of the network apparatus.

The network apparatus includes the flow table and the flow group table, and respective tables may be managed as having different data structures.

For multi-flow grouping, the network apparatus may use only the flow group table, or use both of the flow table and the flow group table. Here, in the case that the network apparatus uses both of the flow table and the flow group table, the flow table may include identification information indicating corresponding flow entries in the flow group table to which the flow table should refer.

Referring to FIG. 9, a procedure for the network apparatus and the network control apparatus to manage the flow table and the flow group table will be explained.

The network apparatus may request flow group information by transmitting the Request-Group message to the network control apparatus (S900). Here, the network apparatus may transmit a packet flow whose flow group should be identified to the network control apparatus together with the message.

The network control apparatus may request addition of a new flow to the flow table by transmitting the Add-Flow message to the network apparatus (S910). Here, the Add-Flow message may include parameters such as 'Flow ID', 'Type', 'Length', 'Value', 'Group ID', etc. explained referring to FIG. 3.

The network apparatus may generate a new flow in the flow table by storing transferred parameters (S920).

The network control apparatus may request addition of information on a new-flow group by transmitting the Add-Group message to the network apparatus (S930). Here, the Add-Group message may include parameters such as 'Group ID', 'Max Bandwidth', 'Min Bandwidth', etc. explained referring to FIG. 4.

The network apparatus may update the flow group table by combining the transferred parameters and an output port Queue ID (S940).

When another packet flow arrives, the network apparatus may request flow-group information for the packet flow by transmitting the Request-Group message to the network control apparatus (S950). Here, the network apparatus may transmit the packet flow whose flow group should be identified to the network control apparatus with the message.

The network control apparatus may request modification of the flow table by transmitting the Modify-Flow message to the network apparatus (S960), and the network apparatus may modify the flow table (S970).

Also, the network control apparatus may request modification of the flow group information by transmitting the Modify-Group message to the network apparatus (S980), and the network apparatus may modify the flow group table (S990).

Figure 10:
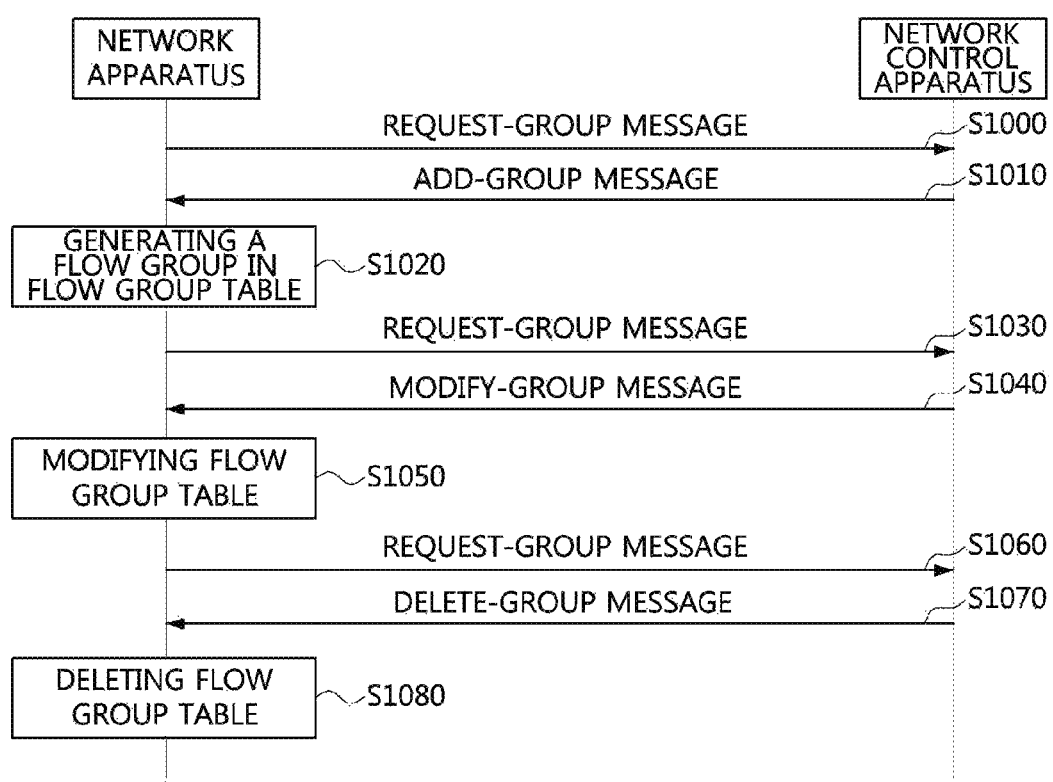
FIG. 10 is a sequence chart to explain a procedure, in which a network apparatus and a network control apparatus manage a flow group table, according to an exemplary embodiment of the present disclosure.

FIG. 10 is a sequence chart to explain a procedure, in which a network apparatus and a network control apparatus manage a flow group table, according to an exemplary embodiment of the present disclosure.

FIG. 10 illustrates a procedure for managing the flow group table, when the network apparatus and the network control apparatus use not the flow table but the flow group table to group multiple flows.

The network apparatus may request flow group information by transmitting the Request-Group message to the network control apparatus (S1000). Here, the network apparatus may transmit a packet flow whose flow group should be identified to the network control apparatus with the message.

The network control apparatus may request addition of a new flow group by transmitting the Add-Group message to the network apparatus (S1010). Here, the Add-Group message may include parameters such as 'Group ID', 'Max Bandwidth', and 'Min Bandwidth' explained referring to FIG. 4.

The network apparatus may update the flow group table by combining the transferred parameters and an output port queue ID (S1020).

The network apparatus may request flow group information by transmitting the Request-Group message to the network control apparatus (S1030). Here, the network apparatus may transmit a packet flow whose flow group should be identified to the network control apparatus with the message.

The network control apparatus may request modification of a flow group by transmitting the Modify-Group message to the network apparatus (S1040), and the network apparatus may modify the flow group table (S1050).

When another packet flow arrives, the network apparatus may request flow group information for the packet flow by transmitting the Request-Group message to the network control apparatus (S1060).

Also, the network control apparatus may request deletion of a flow group in the flow group table by transmitting the Delete-Group message to the network apparatus (S1070), and the network apparatus may delete the flow group table (S1080).

Figure 11:
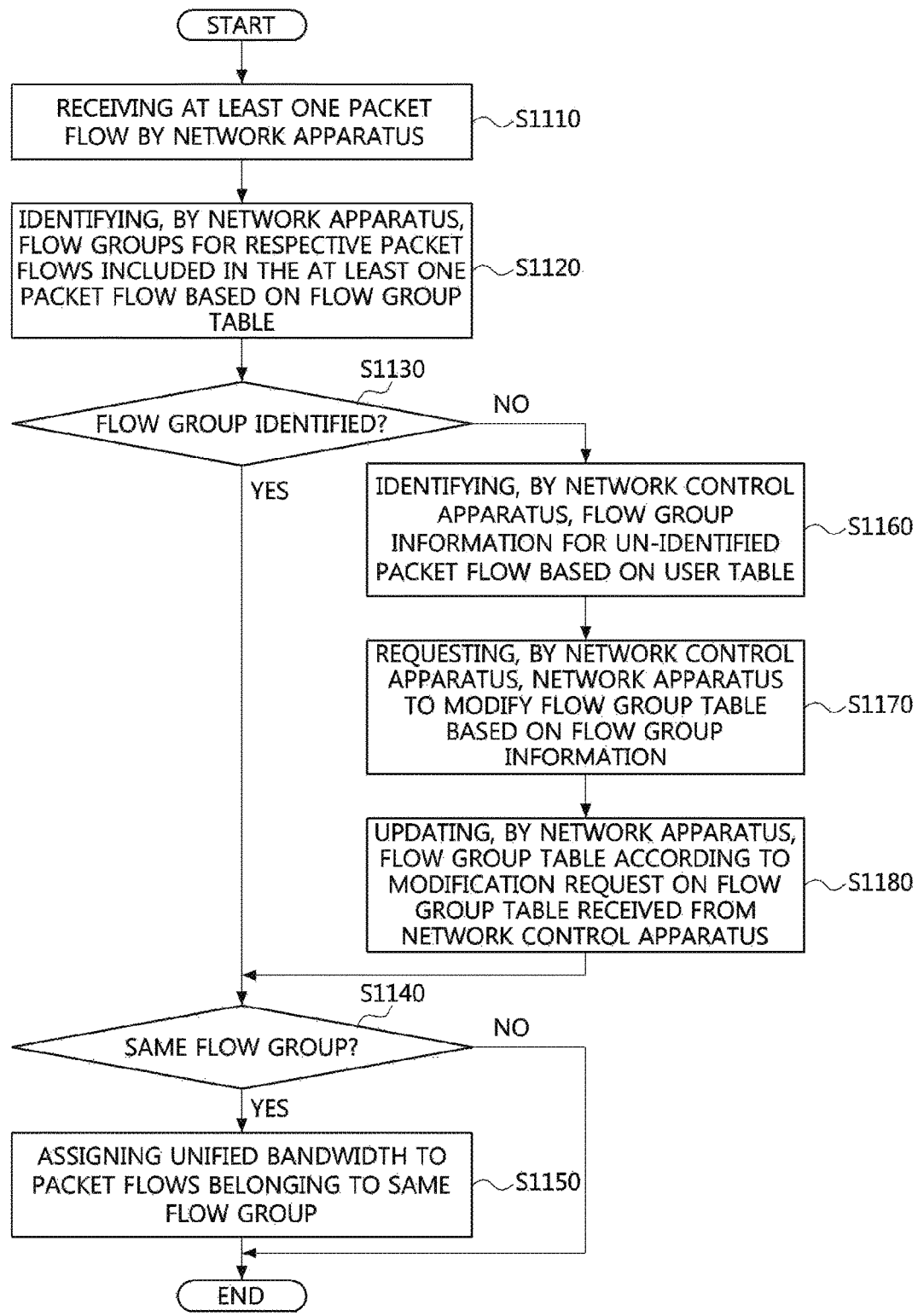
FIG. 11 is a flow chart to explain a bandwidth providing method based on multi-flow grouping according to an exemplary embodiment of the present disclosure.

FIG. 11 is a flow chart to explain a bandwidth providing method based on multi-flow grouping according to an exemplary embodiment of the present disclosure.

Referring to FIG. 11, a method for the network apparatus and the network control apparatus to manage a bandwidth in SDN will be explained.

The network apparatus may receive at least one packet flow (S1110). Here, the at least one packet flow may be transmitted respectively by a plurality of terminals, or transmitted respectively by a plurality of services in a same terminal.

The network apparatus may identify respective flow groups for respective packet flows included in the at least one packet flow by using the flow group table (S1120).

The network apparatus may assign a unified bandwidth to packet flow's belonging to a same flow group among the at least one packet flow and manage the unified bandwidth (S1130, S1140, S1150).

The network control apparatus may receive packet flows whose flow groups are not identified from the network apparatus.

The network control apparatus may identify flow group information for the packet flows whose flows groups are not identified by using the user table (S1160). Here, the user table may have been generated by mapping the user information and the terminal information.

The network control apparatus may request the network apparatus to modify the flow group table based on the flow group information (S1170).

According to the request from the network control apparatus, the network apparatus may update the flow group table (S1180).

The network apparatus and the network control apparatus may group the plurality of flows by using the above-described messages, flow table, and flow group table, and provide a unified bandwidth to the plurality of terminals or the plurality of services.

The network apparatus may assign a unified bandwidth to packet flows determined as belonging to a same flow group based on the updated flow group table (S1140 and S1150).

While the example embodiments of the present invention and their advantages have been described in detail, it should be understood that various changes, substitutions and alterations may be made herein without departing from the scope of the invention.

The invention claimed is:

1. A method of managing a bandwidth, performed by a network apparatus under control of a network control apparatus in a software defined networking (SDN) environment, the method comprising:
receiving a first packet flow and a second packet flow;
identifying a flow group to which the first packet flow and the second packet flow belong based on a flow group table; and
in response to the identifying that the first packet flow and the second packet flow belong to same flow group, assigning a unified bandwidth to the first packet flow and the second packet flow, thereby managing the unified bandwidth,
wherein the same flow group comprises the first packet flow and the second packet flow which are one of transmitted by different terminals of a same user and transmitted by different services of a same terminal, and
wherein the first packet flow and the second packet flow are received by the network control apparatus through different network apparatuses, and the network control apparatus requests each of the different network apparatuses to modify respective flow group tables based on information on the identified flow group.

2. The method according to claim 1, wherein the flow group table comprises at least one of a terminal Medium Access Control (MAC) address, a Virtual Local Area Network (VLAN) identifier (ID), a terminal internet protocol (IP) address, queue identification information, minimum bandwidth information, and maximum bandwidth information.

3. The method according to claim 1, wherein the flow group table is updated according to a flow group table modification request from the network control apparatus.

4. The method according to claim 3, wherein the flow group table modification request is performed based on a user table managed and obtained from a user management system.

5. The method of claim 1, further comprising:
receiving a third packet flow;
identifying a flow group to which the third packet flow belongs based on the flow group table;
in response to not being able to identify the flow group to which the third packet flow belongs, transferring the third packet flow to the network control apparatus;
receiving, from the network control apparatus, a request to modify the flow group table based on the network control apparatus identifying the flow group of the third packet flow based on a user table which stores correspondence between the different terminals and the user;
updating the flow group table; and
assigning the unified bandwidth to the first packet flow, the second packet flow, and the third packet flow such that the first packet flow, the second packet flow, and the third packet flow share the unified bandwidth.

6. The method of claim 1, wherein the different terminals are connected to the different network apparatuses and wherein a respective flow group table of each of the different network apparatuses is modified to share the unified bandwidth such that a portion of the unified bandwidth is assigned to the same flow group in the different network apparatuses.

7. A method of managing a bandwidth, performed in a network control apparatus by controlling at least one network apparatus in a software defined network (SDN) environment, the method comprising:
receiving a first packet flow and a second packet flow through the at least one network apparatus;
identifying a flow group to which the first packet flow and the second packet flow belong based on a user table; and
requesting the at least one network apparatus to modify a flow group table based on information on the identified flow group,
wherein the first packet flow and the second packet flow belong to the same identified flow group and are transmitted by one of: different terminals of a same user and different services of a same terminal, and
wherein the first packet flow and the second packet flow are received by the network control apparatus through different network apparatuses, and the network control apparatus requests each of the different network apparatuses to modify respective flow group tables based on information on the identified flow group.

8. The method according to claim 7, wherein the flow group table comprises at least one of a terminal Medium Access Control (MAC) address, a Virtual Local Area Network (VLAN) identifier (ID), a terminal internet protocol (IP) address, queue identification information, minimum bandwidth information, and maximum bandwidth information.

9. A method of managing a bandwidth, performed by a network control apparatus and a network apparatus in a software defined network (SDN) environment, the method comprising:
receiving, at the network apparatus, at least two packet flows;
identifying, at the network apparatus, respective flow groups for respective packet flows included in the at least two packet flows by using a flow group table; and
assigning, at the network control apparatus, a unified bandwidth to packet flows identified as belonging to a same flow group from among the at least two packet flows, and managing the unified bandwidth, wherein the packet flows identified as belong to the same flow group are packet flows transmitted by one of different terminals of a same user or different services of a same terminal, and wherein the packet flows identified as belong to the same flow group are received by the network control apparatus through different network apparatuses, and the network control apparatus requests each of the different network apparatuses to modify respective flow group tables based on information on the identified flow group.

10. The method according to claim 9, further comprising:
receiving, at the network control apparatus, a packet flow whose flow group is not identified by the network apparatus from the network apparatus; and
identifying, at the network control apparatus, a flow group to which the packet flow whose flow group is not identified by the network apparatus based on a user table.

11. The method according to claim 10, further comprising:
requesting, by the network control apparatus, the network apparatus to modify the flow group table based on information on the identified flow group for the packet flow whose flow group is not identified by the network apparatus.

12. The method according to claim 11, further comprising:
updating, by the network apparatus, the flow group table according to a request to modify the flow group table which is received from the network control apparatus.

13. The method according to claim 9, wherein the flow group table comprises at least one of a terminal Medium Access Control (MAC) address, a Virtual Local Area Network (VLAN) identifier (ID), a terminal internet protocol (IP) address, queue identification information, minimum bandwidth information, and maximum bandwidth information.

* * * * *